(12) United States Patent
Zhuge et al.

(10) Patent No.: US 9,341,503 B2
(45) Date of Patent: May 17, 2016

(54) CROSS-PATH PHASE CALIBRATION FOR HIGH DYNAMIC RANGE DATA ACQUISITION

(71) Applicant: Crystal Instruments Corporation, Santa Clara, CA (US)

(72) Inventors: James Q. Zhuge, Palo Alto, CA (US); Zhengge Tang, San Jose, CA (US); Lei Chen, HangZhou (CN)

(73) Assignee: Crystal Instruments Corporation, Santa Clara, CA (US)

( * ) Notice: Subject to any disclaimer, the term of this patent is extended or adjusted under 35 U.S.C. 154(b) by 286 days.

(21) Appl. No.: 14/057,912

(22) Filed: Oct. 18, 2013

(65) Prior Publication Data

US 2015/0059432 A1     Mar. 5, 2015

Related U.S. Application Data

(60) Provisional application No. 61/870,659, filed on Aug. 27, 2013.

(51) Int. Cl.
| | |
|---|---|
| *H04B 3/46* | (2015.01) |
| *H04B 17/00* | (2015.01) |
| *H04Q 1/20* | (2006.01) |
| *G01D 18/00* | (2006.01) |
| *G01D 9/00* | (2006.01) |

(52) U.S. Cl.
CPC ............... *G01D 18/00* (2013.01); *G01D 9/005* (2013.01)

(58) Field of Classification Search
CPC ..... H04L 1/243; H04L 1/0001; H04L 1/0009; H04L 1/1854; H04L 7/0337; H04L 7/0334; H04L 7/033; H04L 7/0029; H04L 7/0814; H04L 7/0338; G01R 31/31716; H03L 7/091; H03L 7/0814; G06F 1/10

USPC .............. 375/219–228, 316–352, 354–376
See application file for complete search history.

(56) References Cited

U.S. PATENT DOCUMENTS

| | | | | |
|---|---|---|---|---|
| 6,845,126 B2* | 1/2005 | Dent | .................. | H03F 3/24 375/219 |
| 7,158,586 B2* | 1/2007 | Husted | ................ | H04L 27/3872 375/324 |
| 7,302,354 B2 | 11/2007 | Zhuge | | |
| 7,672,364 B2* | 3/2010 | Kang | ..................... | H04B 17/21 375/219 |
| 8,284,824 B1* | 10/2012 | Smaini | ..................... | H04B 1/40 341/118 |
| 8,649,464 B2* | 2/2014 | Eitel | ................... | H04L 27/3863 375/316 |
| 8,665,938 B2* | 3/2014 | Yu | ......................... | H04W 24/10 375/220 |
| 2004/0106380 A1* | 6/2004 | Vassiliou | ................ | H04B 17/20 455/73 |
| 2006/0035601 A1* | 2/2006 | Seo | .......................... | H04B 1/40 455/78 |
| 2007/0047634 A1* | 3/2007 | Kang | ..................... | H03D 3/008 375/226 |

(Continued)

*Primary Examiner* — James M Perez
(74) *Attorney, Agent, or Firm* — Thomas Schneck

(57) ABSTRACT

In a data acquisition instrument with dual A/D converters in each measurement channel, phase corrections between the paths are computed using a locally generated calibration signal. The calibration signal goes through dual paths simultaneously and is stitched into a single signal for analysis by a processor running a Fourier transform where phase differences are easily identified and used to establish a phase correction signal applied to a single master clock supplying clock signals to both paths. A switch allows the calibration signal to be applied to each channel or to no channels when actual data is being collected.

17 Claims, 2 Drawing Sheets

(56) References Cited

U.S. PATENT DOCUMENTS

| | | | | |
|---|---|---|---|---|
| 2007/0147527 A1* | 6/2007 | Egashira | H04L 5/0023 | 375/260 |
| 2010/0052958 A1* | 3/2010 | Roeven | G01R 33/3621 | 341/139 |
| 2011/0075715 A1* | 3/2011 | Kravitz | H04B 1/30 | 375/221 |
| 2011/0292978 A1* | 12/2011 | Kravitz | H04B 1/30 | 375/221 |
| 2012/0230176 A1* | 9/2012 | Komninakis | H04B 1/525 | 370/201 |
| 2013/0329832 A1* | 12/2013 | Morita | H04B 1/0475 | 375/296 |
| 2014/0134943 A1* | 5/2014 | Hobbs | H04B 7/15535 | 455/9 |

* cited by examiner

CROSS-PATH PHASE CALIBRATION FOR HIGH DYNAMIC RANGE DATA ACQUISITION

CROSS-REFERENCE TO RELATED APPLICATION

This application claims priority from U.S. provisional application Ser. No. 61/870,659, filed Aug. 27, 2013.

TECHNICAL FIELD

The invention relates generally to high dynamic range measurement method and system, and more particularly to high dynamic range measurement for a multiple path data acquisition system.

BACKGROUND ART

In a conventional high dynamic range measurement system of the type used, for example, in shock wave and vibration measurement, the input range setting is one of the most important settings. For example, in an analysis system there may be a number of different input voltage range settings for each input channel. The input range setting has a direct impact on the quality of measurement, which is mainly reflected by SNR (Signal-to-Noise Ratio) or dynamic range. Users are often troubled by being unable to set the optimum range because the measured signal either is non-stationary or has an unknown amplitude. For a high channel count system having multiple input ranges, it is even more difficult to get all the input ranges to a suitable value. To deal with this situation, many instruments are designed with an intelligent auto-ranging capability. "Auto-ranging" tries to set the best input range based on an estimated measurement before the test actually begins. Auto-ranging can only deal with stationary or repetitive signals, i.e., those signals without many magnitude changes. For non-stationary signals such as electrical transients, shock waves, impacts, earthquake signals, and the like, auto-ranging usually does not work because each pulse may take a different magnitude. For a signal with long time history and a large range of amplitude change, auto-ranging cannot be applied at all because during the measurement procedure the signal input range, i.e., the amplifier gain setting, cannot be changed.

As described in the publication "New Technology Increases the Dynamic Ranges of Data Acquisition Systems Based on 24-Bit Technology," in SOUND AND VIBRATION, April 2005, pages 8-11, Andersen et al. state that sound and vibration transducers (e.g., microphones) have outperformed other analysis systems in linearity and dynamic performance. For such a system, the ratio between the highest and lowest signal level the system can handle is defined as its "dynamic range." The publication states that if the dynamic range is too low, high range signals will typically be clipped and distorted while the low range signals will typically be buried in system noise that originates from the transducer element and the electronics conditioning the transducer. As a solution, the publication describes utilizing a specialized analog input designed to provide a very high dynamic range of analog circuit pre-conditioning the transducer signal before forwarding the signal to a pair of specially designed 24-bit analog-to-digital converters (ADCs) in two paths. Both data streams from the ACDs are forwarded to a digital signal processing environment, where dedicated algorithms in real-time merge the signals.

In U.S. Pat. No. 7,302,354, assigned to the assignee of this invention, J. Zhuge describes dual A/D (analog-to-digital) signal paths and cross-path amplitude calibration to provide accurate and reliable measurements in a data acquisition system.

In the '354 patent, the input signal is directed to two paths, e.g., Path A and Path B. The first path measures the full range (e.g., +/−10 volts), while the second path includes a high-gain amplifier, such as one having a gain factor of 1024. Each path includes an analog-to-digital converter (ADC). Thus, the preferred embodiment includes a measurement channel with a one-to-one correspondence between the number of paths and the number of ADCs, which sample the input signal simultaneously.

After the ADCs of the different paths convert the input signal into the digital domain, the system selects among measurement points. When the input signal is within the amplitude range of high gain Path B, the system selects the values from Path B. On the other hand, when the magnitude of the input signal is outside the amplitude range of Path B, the system selects the values from Path A. Thus, a subset of measurement points is selected from Path B, the default path, and the remaining measurement points are selected from Path A, so that the selected values at the measurement points are stitched into a final data stream. The total dynamic range of the measurement is increased by roughly 60 dB at full range input.

If Path B will be saturated when a signal is greater than a certain amplitude level, the digitized value from the ADC of Path B should not be used in forming the final data stream. Instead, the value at the corresponding measurement point of Path A is used. The selection of measurements occurs on a point-by-point basis.

There are a number of potential concerns with this implementation. One concern is whether the small phase difference between the different paths will cause difficulties. Previously it was known that by using the same clock source to control the sampling rate of each ADC, the phase match between paths can be optimized.

When addressing this concern, the values that are of greatest importance are those at transition measurement points when the final data stream transitions from one path to another path during a "stitching" process. Without proper treatment, there will be discontinuities at the transitions. The '354 patent uses a special cross-path amplitude calibration process. It is not necessary that the cross-path calibration eliminate, or even reduce, the absolute measurement error of measurement paths. Instead, the calibration is designed to match the errors among the different paths, so that the paths will generate the measurement values as close as possible. This will allow the transition of the signal from one region to another to be very smooth during the "stitching" process.

Cross path amplitude calibration solves the issue of how to adjust the amplitude difference coming from two A/D converters. In an ideal environment and with perfect electronic circuits, there is no phase mismatch between two or multiple A/D converters in different paths. Amplitude adjustments in the time domain would be sufficient. In reality, there is always phase error or phase mismatch between the two paths, in either analog circuitry or inside of the A/D converters. A large mismatch in phase will make the "stitching process" of digital signals coming from two A/D paths difficult.

With current commercially available data acquisition circuitry, when the signals of interest in a lower frequency range, say below 10 kHz range, the phase mismatch is usually insignificant. When the signals of interest are in a higher frequency range, such as 20 kHz or above, the phase mismatch may be more significant.

An object of the invention is to achieve cross path phase calibration in a dual path data acquisition system involving multiple data channels with phase matching.

SUMMARY OF THE INVENTION

In the '354 patent, cross path amplitude calibration is achieved using a single time clock source driving the A/D converters in a dual path instrument system. The present invention retains the cross path amplitude calibration of the '354 patent but improves the performance of the circuitry by adding certain time adjustments to the clock that drives each A/D converter in each path. By slightly adjusting the time clock delay for each of the A/D converters, the phase mismatch of all A/D paths can be greatly reduced.

To make adjustments to the clock delay for each of the A/D converters, it is necessary to determine how much adjustment is needed. To do so, a locally generated signal can be fed into the analog input end of all A/D converter paths simultaneously, then allowing a data processor to receive the raw data from the two paths. The raw data is not stitched during this process. Once the data is received, a discrete Fourier transform (DFT) or fast Fourier transform (FFT), can be applied to data in the two data paths to determine phase differences or a phase match for the A/D converters. With the knowledge of phase differences, the clock time delay can be known, and later applied to the two paths to adjust the clock signal.

While the cross path amplitude calibration and phase calibration can be conducted manually and with an external excitation source, it is preferred to have circuitry that is housed internally in an instrument so that the calibration process can be conducted at any time automatically.

DETAILED DESCRIPTION

Figure 1:
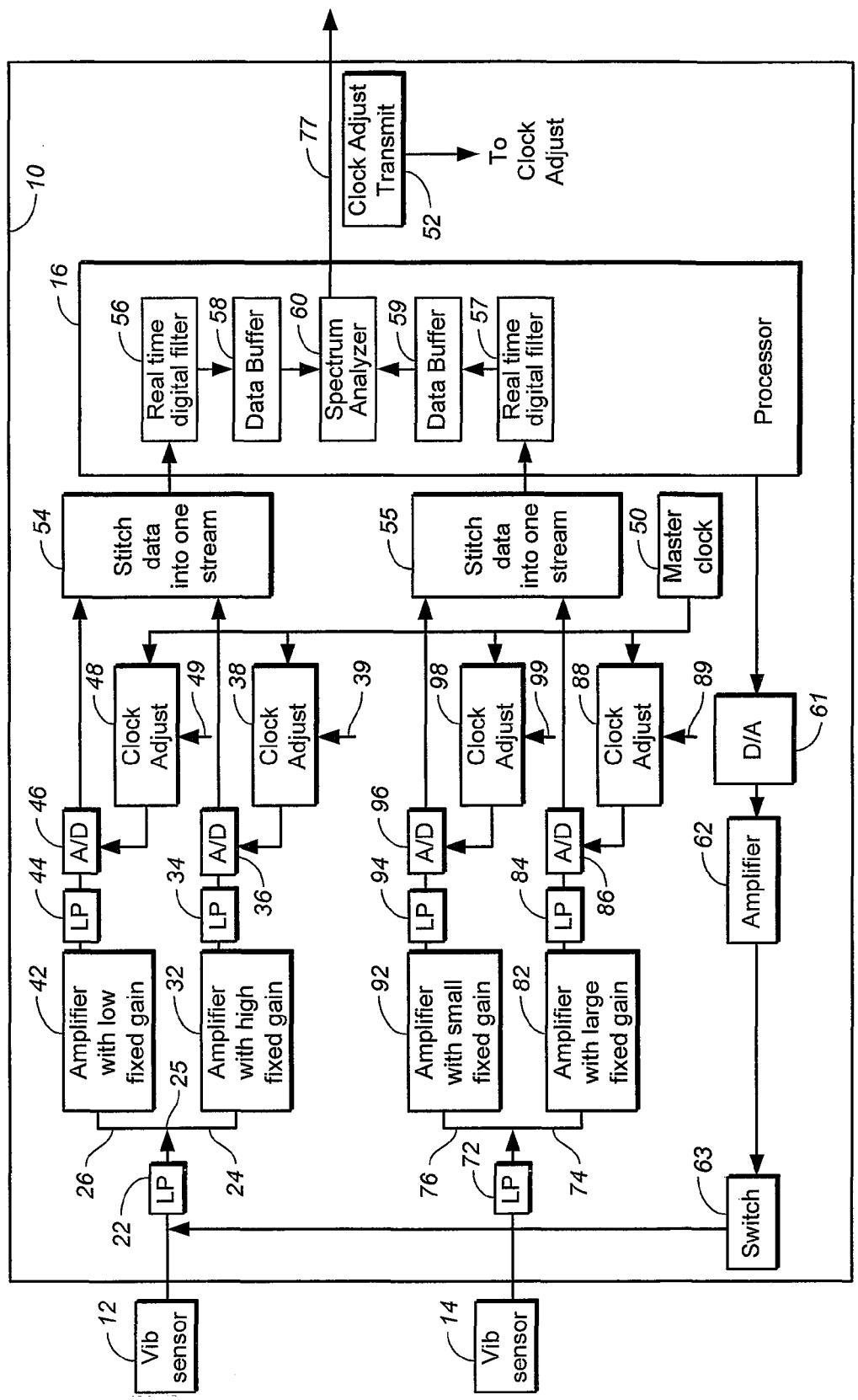
FIG. 1 is a block diagram of a dual channel instrument with the capability of cross-path phase calibration.

With reference to FIG. 1, the data acquisition instrument 10 has two analog measurement sensors 12 and 14 as inputs. Typically the sensors are microphones but could also be vibration sensors, such as accelerometers, or other types of analog sensors. The two sensors 12 and 14 may be located at the distance from each other, with each sensor connected to a processor 16 through a two-path data channel.

Sensor 12 detects analog signals directed into data acquisition instrument 10 where a low pass filter 22 limits the bandwidth of the incoming signal prior to splitting the signal into two paths 24 and 26 at a splitter junction 25. The two paths are characterized be a first path 24 with a high fixed gain amplifier 32 and a second path 26 with a low fixed gain amplifier 42. Each amplifier 32 and 42 is followed by a low pass filter, 34 and 44 respectively, for anti-aliasing purposes. The filters are followed by A/D converter 36 in path 24. Each A/D converter has a clock adjust circuit for applying a time clock delay. Considering one path in comparison to the other, the relative delay corresponds to a phase match. A/D converter 46 has a clock adjust circuit 48, while A/D converter 36 has a clock adjust circuit 38. Path selection is governed as described in the '354 patent.

The amount of clock adjustment sets the phase correction from master clock 50. Each clock adjust circuit 38, 48 is addressed as a phase match pair, a differential signal, with the proper time clock delay on a respective line 39, 49. The specific time clock delay is computed by processor 16 and sent out on clock adjust transmit block 52, described below. Using the clock adjustment from blocks 38 and 48 the A/D converters 36 and 46, respectively, are able to stitch data from the two paths into one stream in the stitcher 54. The processor 16 computes the two path delay as follows.

Figure 2:
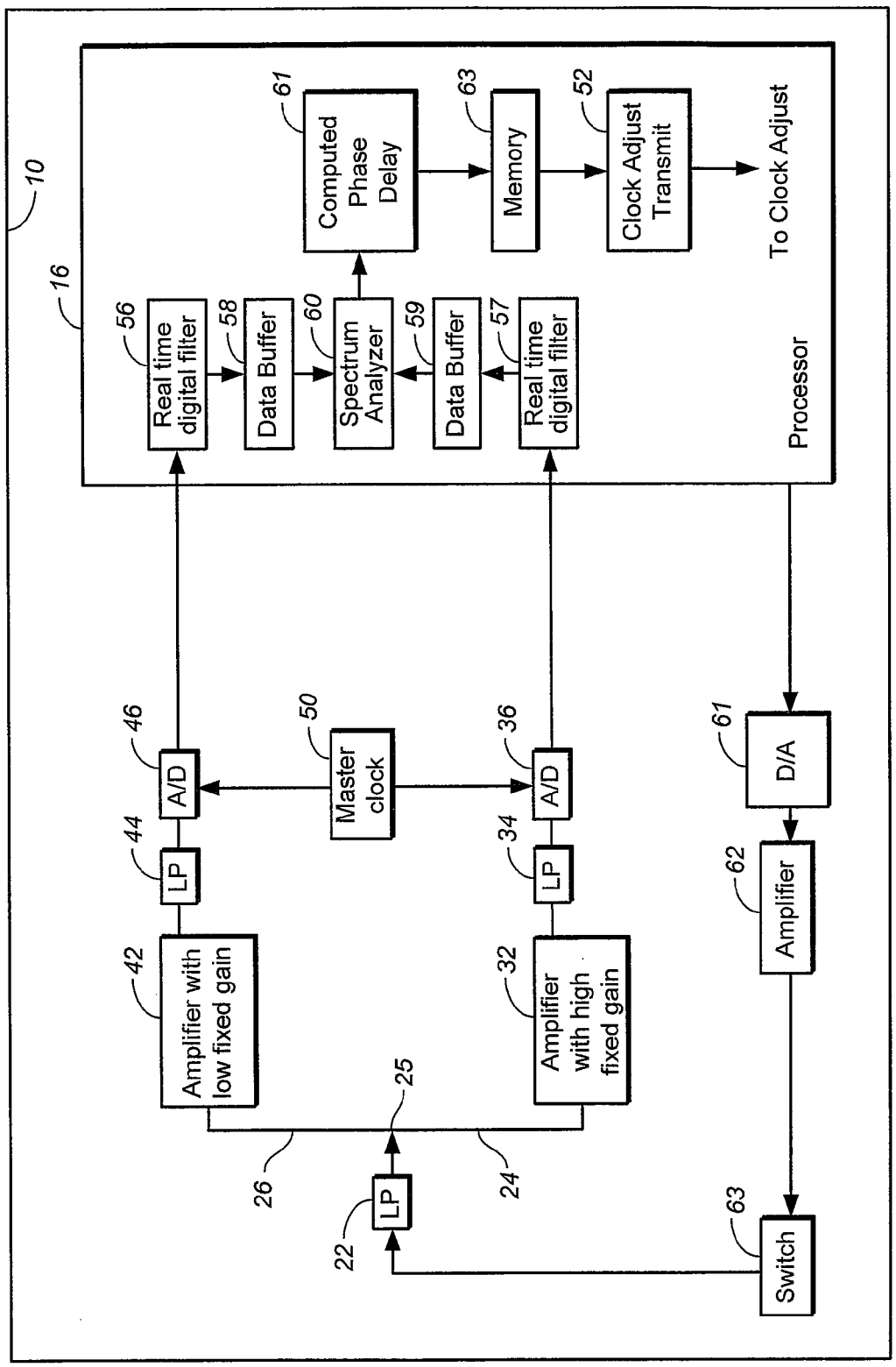
FIG. 2 is a block diagram of a cross-path phase calibration dual channel instrument in a phase calibration mode.

FIG. 2 illustrates the calibration mode of the instrument 10 shown in FIG. 1. The input vibration sensors are not shown because switches, not shown in FIG. 1, block them from respective low pass filters 22 and 72. Instead, the calibration signal is switched into low pass filter 22 from D/A converter 61 through amplifier 62 and the calibration enable switch 63. When the instrument 10 is not in the calibration mode, switch 63 blocks signal from the D/A converter. In FIG. 2, all clock adjust and stitch data circuit are not shown because they are not enabled in the calibration mode. Similarly, other dual path channels are not enabled and are not shown. A calibration signal from switch 63 passes through low pass filter 22 and is split into two paths between high gain amplifier 32 and low gain amplifier 42. After filtering by respective low pass filters 34 and 44, the split signals pass through A/D converters 36 and 46, with synchronization by master clock 50, before entering processor 16 for a first channel for spectrum analysis.

It is well-known that the phase difference in frequency domain of two sine signals can be translated to the time delay between these two signals in the time domain. For example, a 90 degree phase difference at 1 KHz indicates a quarter millisecond delay in time between the two measured signals. If we feed identical signals in two paths, the calculated phase difference will indicate the time delay between the two signals in the paths.

The processor 16 generates a phase match value for each path in the spectrum analyzer 60 when data from each path is used to compute phase delays in computed phase delay block 61. Phase match values are stored in memory 63. The phase match is a differential signal, one phase related to another, that will be transmitted to the clock adjust circuits of FIG. 1 when the instrument is out of the calibration mode. The phase match values are queued for transmission in clock adjust transmit buffer 52.

In processor 16 phase match is computed assuming that in a typical dynamic signal analyzer or vibration data collector, the group time delay of a signal conditioning filter and an anti-aliasing filter, phase-linearity and time delay of the A/D converters in difference of high gain versus low gain paths can be measured by one signal value: phase match between paths. Phase match, a differential signal, is the value of the maximum phase deviation between each pair of paths at a certain frequency. Phase match reflects the difference of the time delays in time domain of the signals between each pair of paths. Previous studies by others teach that the time delay of two signals can be found from the phase spectrum of the cross spectrum.

Assume $X(\omega)$ is the Fourier spectrum of the input signal $x(t)$; $Y_1(\omega)$ and $Y_2(\omega)$ are the Fourier spectra of measured signals from two input paths:

$$Y_1(\omega) = H_1(\omega) * X(\omega) \text{ and } Y_2(\omega) = H_2(\omega) * X(\omega)$$

where $$H_1(\omega) = M_1(\omega) e^{j\phi_{sub1}(\omega)} \text{ and } H_2(\omega) = M_2(\omega) e^{j\phi_{sub2}(\omega)}$$

where $H_1(\omega)$ and $H_2(\omega)$ are the transfer functions of the front end of two input paths $M_1(\omega)$ and $M_2(\omega)$ are the magnitude functions and $\phi_1(\omega)$ and $\phi_2(\omega)$ are the phase functions. The magnitude and phase functions indicate how the magnitude and phase of the transfer function vary with frequency. If we calculate the cross-spectra $G_{21}(\omega)$ between $Y_1(\omega)$ and $Y_2(\omega)$:

$$G_{21}(\omega) = \text{Conjugate}(Y_1(\omega)) * Y_2(\omega)$$
$$= X(\omega) * M_1(\omega) e^{-j\Phi sub1(\omega)} * X(\omega) * M_2(\omega) e^{j\Phi sub2(\omega)}$$
$$= X^2(\omega) * M_1(\omega) * M_2(\omega) e^{j(\Phi sub2(\omega) - \Phi sub1(\omega))}$$

then we see that the phase of the cross-spectrum $\phi_2(\omega)-\phi_1(\omega)$ is a perfect way to measure the time delay. Although the phase spectrum is a frequency dependent function, it can be shown that a constant time delay will make a constant slope of $\phi_2(\omega)-\phi_1(\omega)$ function, or Time delay=$(1/\omega)*(\phi_2(\omega)-\phi_1(\omega))$ Note that the phase value should be normalized against 360 degrees. For example, a phase of 10 degree at frequency of 10 kHz indicates a time delay of:

Time delay=$(1/10,000\text{ Hz})*(10/360)=2.77$ us

Returning to FIG. 1, the time delay in the paths (i.e., phase match), is the differential signal applied from the clock adjust transmit block 52 shown in both FIG. 1 and FIG. 2 to the clock adjust circuits 38 and 48 on lines 39 and 49, respectively in the upper channel of FIG. 1. In processor 16, a real time filter 56 and a data buffer 58 are used to queue and bandwidth limit data for the spectrum analyzer 60.

In order to look at the phase match at all concerned frequency areas in the calibration mode, we can use various signal excitations, such as a single sine wave, white noise, rectangular wave, etc. as set by a command from processor 16 to signal source 61, a D/A converter as a calibration signal source. To measure the phase, the requirement is that these excitation signals must have certain energy at high frequencies. A DC signal, i.e., a signal with constant voltage, cannot serve the purpose. The D/A converter 61 together with the data processor 16 provides the maximum flexibility and programmability therefore is preferred.

The instrument 10 of FIG. 1 has a second channel associated with sensor 14. The sensor 14 detects analog signals directed into instrument 10 with different circumstances than sensor 12 that can arise from a different position or perhaps a different sensor mechanism. In any event the circuitry of the second channel is the same as the circuitry of the first channel, including a low pass filter 72 and the two paths 74 and 76 feeding the high gain amplifier 72 and low gain amplifier 92, respectively. Each amplifier 82 and 92 is followed by a low pass, filter 84 and 94, respectively, for anti-aliasing purposes. The filters are followed by respective A/D converters 86 and 96 in the two paths 74 and 76 for cross path amplitude calibration. Each A/D converter has a respective clock adjust circuit 88 and 98, with phase match inputs 89 and 99. The phase match is computed by processor 16 and transmitted to clock adjust block 52. Using the clock adjustments from master clock 50, a crystal oscillator, each clock adjust circuit 88 and 98 is addressed with a phase match differential signal applied on lines 89 and 99 based upon use of the switched calibration signal described above. With the phase match information, the A/D converters of blocks 86 and 96 are able to stitch data from the two paths into one stream in the stitcher 55 so that the processor 16 can compute the two path delay for clock adjustment.

Time delays of the sampling clock are established by internal calibration from a reference source 61, as previously mentioned with reference to FIG. 2. In review the reference source is preferably a D/A converter, but could be a DC source or an analog signal source. A D/A loop is to generate a calibration source signal to compute the phase match value between two paths of each measurement channel. A switch 63 is used to turn on or off the process. During the time of extracting phase match values, the analog source signal is put into each measurement channel. The spectrum analyzer 160 will compute the phase match values which are stored in the processor and can be translated into the time delay of A/D converters. This assures us that in the measurement stage the real signals from the sensors will be phase matched by adjusting the sampling clock delay of each A/D converter. The calibration signal could be a sine wave, square wave or rectangular shape waveform, sawtooth waveform or white noise, as mentioned above. The signal is amplified in amplifier 62 to the desired amplitude. A switch 63 is connected to amplifier 62 so that the analog excitation signal from amplifier 62 can be fed to a selected one of the low pass filters 22 and 72 at the same time. It is important that the connection from switch 63 to each of the low pass filters 22 and 72 be arranged such that the excitation signal arrives at only one of the two channels so that each channel is calibrated independently. Once calibration is established in each channel, the dual paths to the A/D converts allow phase match signals to be applied to the paths prior to stitching in FIG. 1 using stitch circuits 54 and 55. After stitching, signals go to real time filters 56 and 57. The real time filters maybe either IIR or FIR filters. A real time filter is one in which each incoming data point is processed without a time gap. The data buffers 58 and 59 connected to real time filters 56 and 57 respectively, allow accumulation of data words of desired length prior to forwarding the data words to a spectrum analyzer 60. The spectrum analyzer uses a fast Fourier transform analyzer or discrete Fourier transform to transform the time domain signals into the frequency domain. For each channel, a spectrum analysis is performed and a phase match differential signal is produced using the two paths in each channel in the calibration mode and stored in memory for transmission to the clock adjust transmitter 52 that sends the phase match signals to clock adjust circuits 38 and 48 of the first channel and clock adjust circuits 88 and 98 of the second channel, with each pair of clock adjust circuits receiving one phase match signal on respective input lines 39, 49 of the first channel and 89, 99 of the second channel. Once the instrument is calibrated, each channel takes data from an input sensor that is then cross path amplitude and phase range corrected data. The spectrum analyzer 52 produces output signals on line 77 that are available for general use outside of instrument 10. Signals from both input channels are available for further processing.

Note that amplitude and phase calibration values are computed at different times. Usually, amplitude and phase calibrations are conducted when the system is just turned on, or right before measurements are taken. Once values are computed, these parameters will be applied when data measurements are taken. The switch 63 is used to turn on and off the calibration process. When it is turned on, a calibration source signal will be applied to each input; otherwise, the sensor signals will come in.

Also, note that the phase match value is calculated using the spectral analysis method when the signal source is applied to two paths of each channel simultaneously. In other words, the data from both paths of a measurement channel comes into the processor for computation simultaneously.

What is claimed is:

1. An analog data acquisition instrument comprising:
analog input ports in a plurality of channels connected through switches to dual paths in each of the plurality of channels for A/D conversion by an A/D converter in each of the dual paths and transmission to a processor;
a calibration mode switch selectively blocking access of the analog input ports to the processor and enabling a calibration signal to traverse the dual paths in each of the plurality of channels to the processor where a computed phase delay is established and stored;
a clock adjust circuit in each of the dual paths where the computed phase delay is applied, the clock adjust circuit in each respective one of the dual paths outputting adjusted clock signals based on the computed phase delay to be received by the respective A/D converter of each of the dual paths; and
a stitcher circuit connected to each of the dual paths downstream of the clock adjust circuit, the stitcher circuit producing a single data stream to the processor for phase delay corrected output.

2. The instrument of claim 1 wherein said processor comprises a spectrum analyzer.

3. The instrument of claim 1 wherein said processor comprises a spectrum analyzer connected to a real time digital filter for each of the plurality of channels.

4. The instrument of claim 1 wherein the processor transmits a signal to a D/A converter thereby forming the calibration signal.

5. The instrument of claim 1 further comprising a housing having said analog input ports and a sensor associated with each of the plurality of channels external to the housing and communicating with one of the analog input ports.

6. An analog data acquisition instrument comprising:
a housing having analog data input ports connected to receive transducer analog data, each of the analog data input ports associated with a splitter;
dual data paths extending from the splitter to a stitcher, including a first data path having a low fixed gain amplifier feeding a first A/D converter with an associated clock adjust circuit and a second data path having a high fixed gain amplifier feeding a second A/D converter with an associated clock adjust circuit, the stitcher selecting between the amplifiers in a manner favoring signals from the high fixed gain amplifier but avoiding saturation signals of the high fixed gain amplifier by switching to the low fixed gain amplifier during saturation;
a calibration mode switch disabling the analog data input ports during a calibration mode;
a processor with input and output ports, the input port of the processor and having a spectrum analyzer connected to the stitcher, the processor generating a phase match signal in the spectrum analyzer that is transmitted from an output port of the processor to the clock adjust circuits in each of the dual data paths, wherein the clock adjust circuits provide time synchronization to the first and second A/D converters; and
a local analog signal source, within the housing, transmitting analog signals to the analog data input ports to provide a calibration signal source to each of the dual data paths.

7. The instrument of claim 6 wherein each of the analog data input ports is connected to a transducer generating the analog signals, with the dual data paths defining a channel, wherein the data acquisition instrument comprises at least two channels.

8. The instrument of claim 6 wherein each of the analog data input ports is connected to a low pass filter prior to the splitter.

9. The instrument of claim 6 wherein each of the fixed gain amplifiers is connected to a low pass filter between the amplifier and the A/D converter in the path associated with the amplifier.

10. The instrument of claim 6 wherein the spectrum analyzer is connected to a real time digital filter.

11. The instrument of claim 6 wherein the analog data input ports are each connected to a microphone.

12. The instrument of claim 6 wherein the analog data input ports are each connected to a vibration sensor.

13. The instrument of claim 6 wherein the spectrum analyzer includes a FFT device.

14. The instrument of claim 6 wherein each of the clock adjust circuits is connected to a master clock.

15. The instrument of claim 6 wherein the processor output port extends outside of the housing.

16. A method of calibrating a multi-channel analog data measurement system comprising:
for each channel of the multi-channel analog data measurement system, directing an analog input signal through two parallel signal paths having signal amplifiers with different fixed gains and different phases, said parallel signal paths having digital outputs of measurement values at corresponding measurement points;
establishing a phase match between the corresponding measurement points by applying a phase correction to A/D sampling of the measurement points; and
generating a calibrated final data stream from said digital outputs of said parallel signal paths;
wherein in a calibration mode with connection of the analog input signal through the parallel signal paths being disabled by switching units, the phase correction for each of the channels is determined by conducting a spectral analysis of a calibration signal through the respective parallel signal paths.

17. The method of claim 16 wherein performing the calibration for each of the channels involves generating an analog test signal and applying the test signal as the calibration signal through the respective parallel signal paths.

* * * * *